(No Model.)
C. J. & G. A. STROMGREN.
HOG TROUGH.
No. 360,829. Patented Apr. 5, 1887.
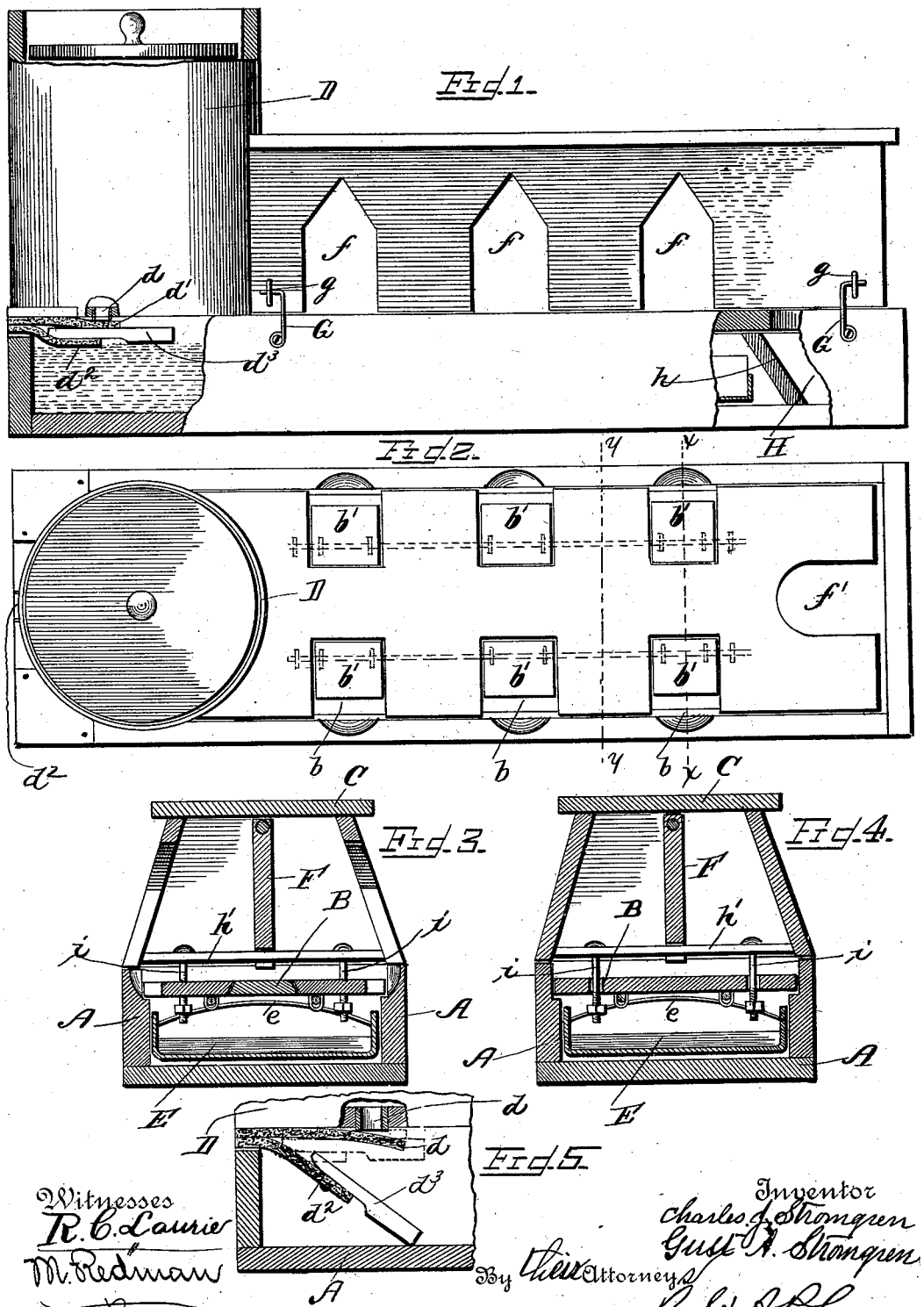

UNITED STATES PATENT OFFICE.

CHARLES J. STROMGREN AND GUST. A. STROMGREN, OF NORWAY, KANSAS.

HOG-TROUGH.

SPECIFICATION forming part of Letters Patent No. 360,829, dated April 5, 1887.

Application filed December 18, 1886. Serial No. 221,963. (No model.)

*To all whom it may concern:*

Be it known that we, CHARLES J. STROMGREN and GUST. A. STROMGREN, citizens of the United States, residing at Norway, in the county of Republic and State of Kansas, have invented certain new and useful Improvements in Hog-Troughs; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an apparatus for watering stock, and has for its object to improve and simplify the construction of such devices, whereby their efficiency and portability is increased.

The improvement consists in the novel features more fully hereinafter set forth, claimed, and shown in the annexed drawings, in which—

Figure 1 is a side view, parts broken away, of our improved device. Fig. 2 is a plan view of the same having the cap removed. Fig. 3 is a transverse sectional view on the line X X of Fig. 2. Fig. 4 is a similar view on the line Y Y of Fig. 2; and Fig. 5 is a detailed view showing the operation of the valve.

The apparatus comprises the trough A, the cover B, the cap C, the tank N, and the mud-pan E. The tank is supported upon one end of the trough in such a manner that it can be readily removed when it is desired to transport the device to a new place. It is provided with an opening in its bottom, in which is fitted the short tube $d$, which projects slightly below the bottom and is closed by the valve $d'$, composed of a piece of leather or rubber secured to the bottom of the tank, to one side of the tube $d$. A second strip of leather or kindred material, $d^2$, is secured to the bottom, preferably by the same means which secures the valve $d'$ in position, and extends in the same direction as the valve $d'$, and has the float $d^3$ secured to its free end. The inner end of the float extends between the valve $d'$ and the strap $d^2$, so that when the float rises with the water it (the inner end of the float) will press upon the valve and force it close against the end of the tube $d$, and thus cut off the supply of water. It will be noticed that the float has a twofold movement—the one upwardly, the other in the direction of its length, which latter movement causes the float to act after the fashion of a wedge and forces the valve securely against the end of the tube $d$.

The mud-pan, which is a shallow tray, is placed in the bottom of the trough, and is for the purpose of catching all sediment, and can be readily removed by the handles $e$, which are provided for the purpose, when it is desired to clean the trough.

The cover B is fitted in the trough, and is free to fall and rise with the water, and floats upon the surface of the same. Openings $b$ are formed in opposite edges, so that the stock can have access to the water. Doors $b'$ close the openings, and are hinged near their rear ends, so as to turn down when pressed upon. The doors are sufficiently long to strike against the bottom of the trough when turned down, which prevents their folding back. The water returns then to a normal position.

The cap C has openings $f$, corresponding with the position of the openings $b$, and protects the water in the trough from the rays of the sun and prevents the stock running over the cover B. The openings $f$ on one side are opposite the openings on the other side, and are separated by the swinging partition F, which divides the stock on one side of the trough from the stock on the opposite side of the trough. The cap is secured to the trough by the hooks G and eyes $g$, so it can be readily removed when it is desired to clean the trough or transport the device.

The trough has a compartment, H, formed at the end opposite the tank by the partition $h$, in which salt is placed for the stock. The cap extends over this compartment, and has an opening, $f'$, in the end for the purpose of permitting the stock to have access to the salt. Braces $h$ extend transversely of the cap between the openings $f$, and rods or bolts $i$, passing through the braces and through the cover B, unite the same, so the cap and cover may be removed together. The rods are of a sufficient length to permit a free movement of the top when adapting itself to the level of the water.

In practice water is supplied to the tank and escapes therefrom directly into the trough through the tube *d*. The water rising in the trough elevates the float till a certain level is reached, when the float, pressing upon the valve, as hereinbefore described, will cut off the supply of water from the tank to the trough. As the water lowers, the float will correspondingly fall and permit the water to escape from the tank. The floating cover B accommodates itself to the level of the water in the trough, and prevents dirt, leaves, &c., from getting into the water, while it at the same time guards against the stock entering too far into the trough and stirring up any sediment.

Having thus described our invention, what we claim, and desire to secure by Letters Patent, is—

1. In a trough for feeding hogs, the combination, with the trough, of the floating cover having openings through which the stock has access to the water, substantially as set forth.

2. The combination, with the trough, of the floating cover, horizontally arranged and having openings through which the stock has access to the water, and hinged doors closing said openings and normally held in a horizontal position and across the openings by the water, substantially as and for the purpose specified.

3. The combination of the trough, the floating cover, the removable cap, and the rods connecting the cover with the cap, substantially as and for the purpose described.

4. The combination of the trough, the floating cover, the cap, and the hinged partition, substantially as set forth.

5. The combination, with the trough and the tank N, having an opening in its bottom, of the valve, the flexible strip extending in the direction of the valve and secured at one end to the tank, and the float secured, substantially as described, to the free end of such strip, whereby the float has a combined backward and upward movement, substantially as and for the purpose set forth.

6. The herein shown and described device for watering stock, comprising the trough having a compartment formed at one end, the tank located at the opposite end, having an opening in its bottom, the valve closing such opening, the flexible strip and float, the mud-pan, the floating cover having openings, hinged doors closing the openings, and the cap having openings corresponding with the openings in the cover, substantially as described.

In testimony whereof we affix our signatures in presence of two witnesses.

CHARLES J. STROMGREN.
   GUST. A. STROMGREN.

Witnesses:
 H. HILLIS,
 M. D. INGRAHAM.